Dale J. Hohbach
Ronnie D. Davis
INVENTORS

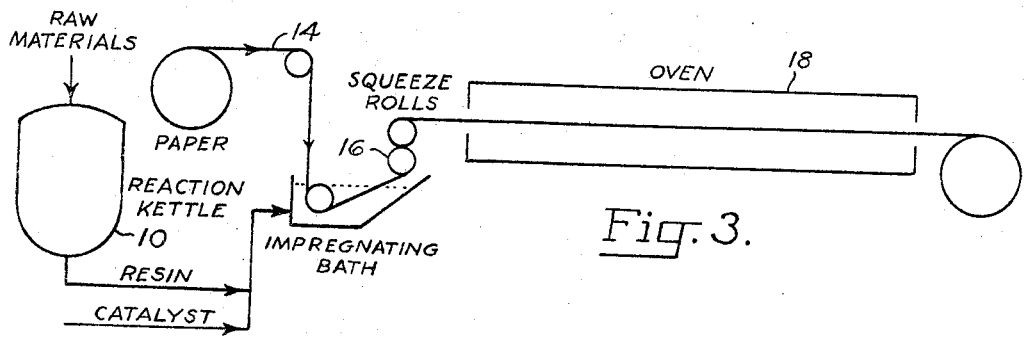
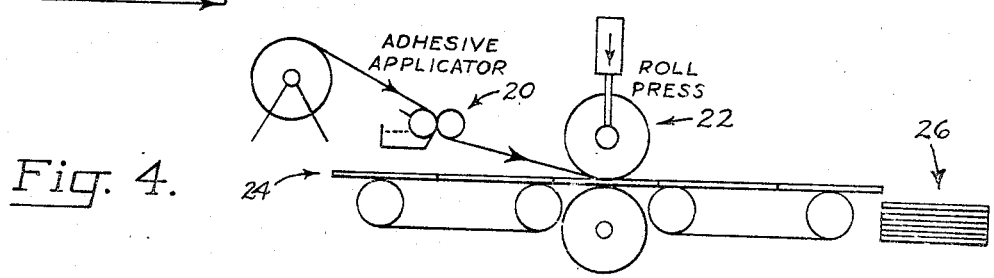
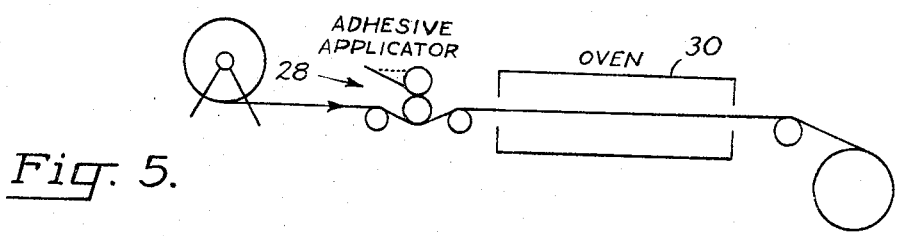
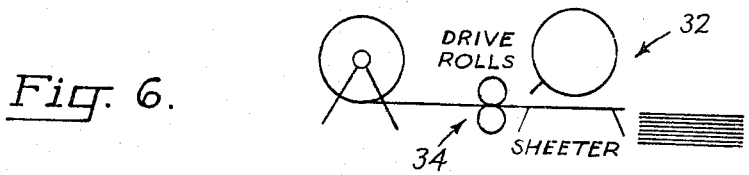
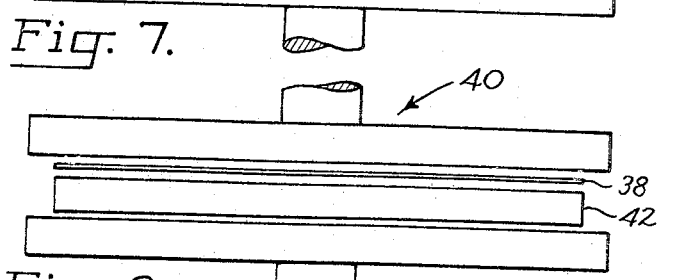
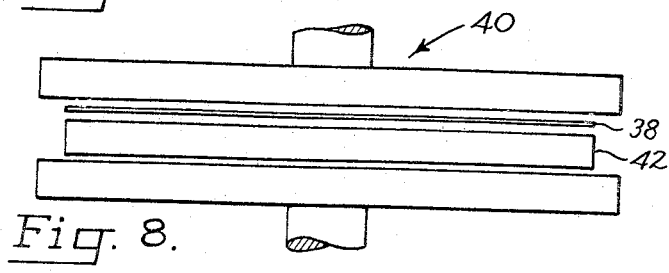

United States Patent Office 3,490,989
Patented Jan. 20, 1970

3,490,989
RESIN-IMPREGNATED, FIBROUS SHEET OVERLAY PRODUCTS AND METHOD FOR THEIR PRODUCTION
Dale J. Hohbach and Ronnie D. Davis, Hillsboro, Oreg., assignors to Pacific Adhesives Company, Inc., a corporation of Ohio
Filed Jan. 3, 1966, Ser. No. 518,230
Int. Cl. B32b 27/42, 27/10; D06n 7/06
U.S. Cl. 161—263
8 Claims

ABSTRACT OF THE DISCLOSURE

A flexible, wear-resistant, overlay sheet for plywood and like structural bases is made by cooking an alkali-catalyzed mixture of from 2–4 mols of formaldehyde and one mol of acetone at a pH of 7–10.5 to an aqueous alkali dilutability end point of from about 0.5 to 500 ml./1 ml. of the resin product. A paper or other porous sheet then is impregnated with the resin product and cured sufficiently to develop at least about 60% of its potential internal bond strength. A surface of the resulting sheet then may be coated with adhesive and applied to the structural base.

---

This invention relates to resin-impregnated fibrous sheet overlay products and to a method for their production. It pertains particularly to resin-impregnated paper sheets which are applicable as overlays for plywood panels to mask surface defects present therein.

In the plywood and related arts, it is common practice to cover a plywood or other structural base with a resin-impregnated paper sheet in order to mask knot holes, grain irregularities, splits, and other surface defects which may be present on the underlying base, as well as to provide a smooth, paintable exterior surface of attractive appearance.

In one such process, paper sheets are impregnated with partly cured phenolic resin, coated with adhesive, and glued to the exterior surface of a plywood base sheet. The gluing operation is carried out by placing in a platen press an assembly of plywood panels overlaid with the paper sheets and hot pressing until the paper sheets have become adherent to the plywood base, and until the resin content of the sheets has become fully cured.

The process above described is characterized by the significant disadvantage that a relatively long press time is required to cure the resin content of the sheets, thus limiting production and increasing correspondingly the cost of the product. If it is attempted to overcome this difficulty by heat curing the resin content of the paper sheets before applying them to the plywood, the paper becomes so brittle that it is handled with difficulty and in no event can it be rolled into the rolls employed in rapid, efficient, continuous, roll-coating operations.

The present invention is predicated on the discovery that by impregnating fibrous overlay sheets with a specific resin, i.e. an acetone-formaldehyde resin at a predetermined degree of resin advancement, the impregnated sheets thereafter may be oven-cured substantially completely while still retaining sufficient flexibility to be rolled into rolls. Accordingly they may be coated with an adhesive and pressed onto a plywood or other structural panel underlayment in a continuous contact operation requiring but a few seconds. Furthermore, the highly-cured, resin-impregnated paper overlayment provides superior masking qualities, as well as superior properties of weather resistance, alkali resistance and abrasion resistance.

Figure 1:
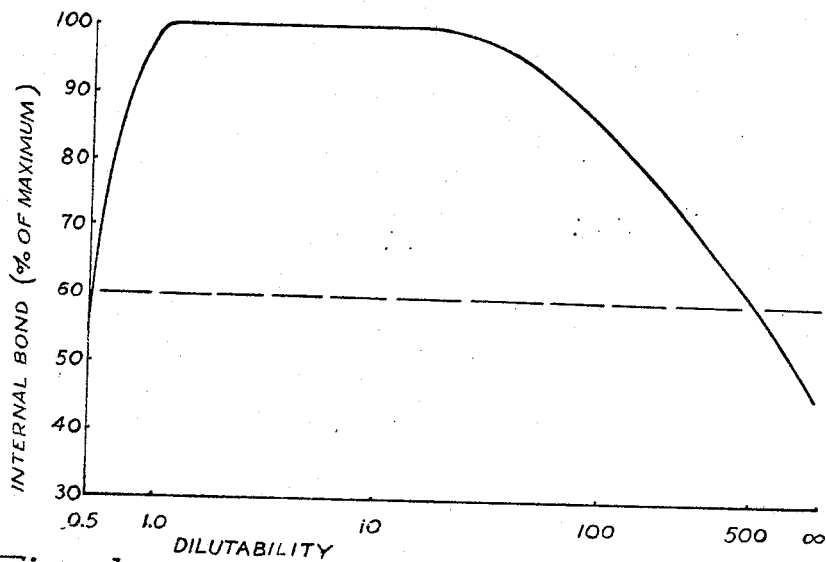
Figure 2:
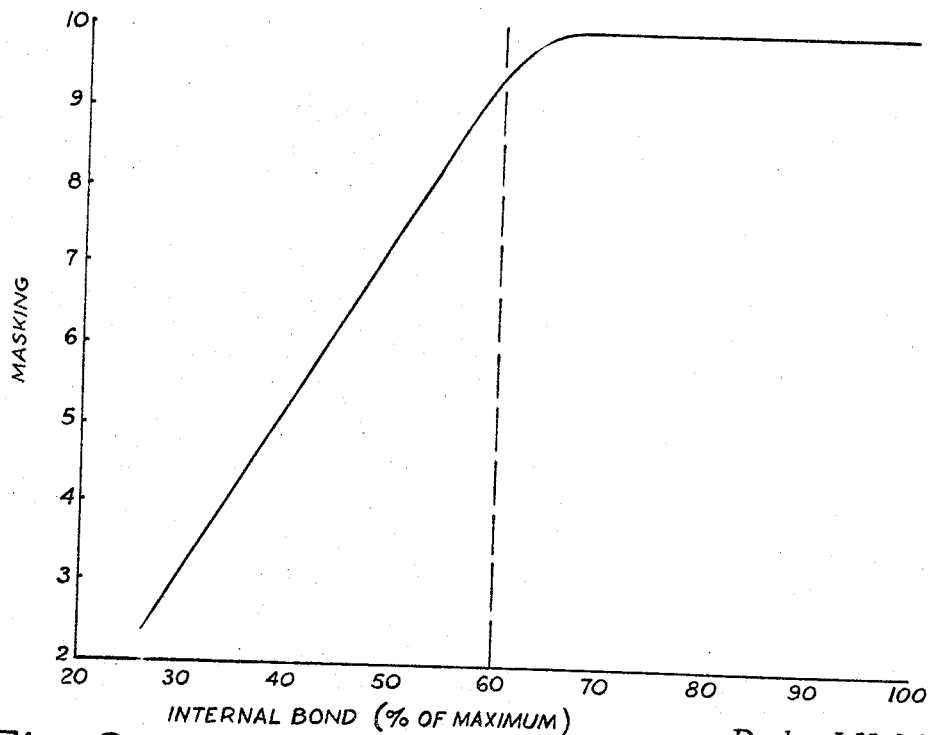

In the drawings:
FIG. 1 is a plot of dilutability of the resin-impregnant vs. internal bond developed by the impregnated paper after curing, illustrating the critical character of the degree of advancement of the resin used as the impregnating agent;
FIG. 2 is a plot of internal bond characteristic of the degree of cure of the resin content of the impregnated fibrous sheet vs. the masking qualities of the sheet;
FIG. 3 is a schematic view of a plant sequence which may be employed in producing a continuous, cured, resin-impregnated fiber sheet;
FIG. 4 is a schematic plant layout for applying a continuous impregnated sheet produced by the apparatus of FIG. 3 to the continuous roll lamination of the sheet to a structural panel base;
FIG. 5 is a schematic view of apparatus for adhesive-coating a roll of the impregnated continuous sheet;
FIG. 6 is a schematic view of apparatus which may be employed for cutting the adhesive-coated continuous sheet into lengths for application to an underlying base; and
FIGS. 7 and 8 illustrate schematically one-step and two-step procedures, respectively, for making such application of the impregnated sheets.

As has been indicated above, the resin impregnated fibrous sheets of the invention are intended for application on various categories of rigid substrates including plywood, hardboard, particle board, bagasse board, lumber, doors, sheet metal, glass sheets, asbestos board, and the like. These substrates may be variously sized and treated.

The application of the overlayment has for its purpose the masking of surface defects and the provision of a continuous exterior surface of attractive appearance and high performance qualities of weather resistance, alkali resistance, and abrasion resistance. Since one of the major applications of the presently described product is in the manufacture of plywood overlaid with resin-impregnated paper, the invention is described herein with particular reference to this application, although no limitation thereby is intended.

A wide variety of porous fibrous sheets may be employed as the overlayment. Suitable fibrous sheets comprise, for example, sheets of cellulosic material such as the various saturating and impregnating papers, liner board, sulfite papers, the various fine papers, and alpha cellulose. These materials may be employed in the bleached, unbleached, or colored condition.

Other porous sheets which may be employed comprise sheets composed of non-cellulosic materials such as fiberglass, asbetos and various of the synthetic fibers such as rayon. In general, all of these materials may be used in their manufactured condition without special preliminary treatment.

The resinous component of the assemblies comprises broadly an acetone-formaldehyde resin, i.e. the resinous condensation product of acetone and formaldehyde, advanced to a predetermined and critical degree as required to impart adequate internal bond to the final impregnated paper product.

It has been found that the dilutability of the resin mixture gives a direct measure of internal bond development. The term "dilutability" as used herein signifies the amount in milliliters of an 11.3% by weight sodium carbonate solution which can be added to 1 milliliter of the resin at 25° C. in order to obtain a stable cloud point, i.e. a cloud which persists for 5 minutes. As indicated by FIG. 1, for present purposes, the dilutability of the resin should lie within the range of 0.5 and 500 milliliters.

Ordinary commercial acetone and commercial formaldehyde may be employed in the manufacture of the resin. The formaldehyde may be used in the form of its commercial aqueous solutions. Materials which under the conditions of the reaction are converted to formaldehyde also may be used. Such materials are paraformaldehyde, glyoxal, trioxane, and hexamethylenetetramine.

The relative proportions of formaldehyde and acetone to be used varies within mol ratio limits of 2–4 mols of formaldehyde for each mol of acetone.

I more or less formaldehyde than the indicated amount is used, poor yields of resin are obtained.

A suitable catalyst is employed to promote the condensation reaction. In general an alkaline catalyst such as sodium hydroxide, potassium hydroxide, sodium carbonate and potassium carbonate may be used for this purpose. A sufficient amount of the catalyst is used to create and maintain in the reaction mixture a pH of from 7 to 10.5.

The preparation of the resin thus may be effectuated in a conventional resin cooker by adding the reactants to the reaction kettle 10 (FIG. 3) and maintaining them therein at substantially refluxing temperature until the desired end point of reaction has been reached.

After the resin has been prepared, it is withdrawn from the reaction kettle and transferred to impregnating bath 12. If desired, or necessary, an additional amount of sodium carbonate, sodium hydroxide or other catalyst may be added to the partially advanced resin to increase its pH to a value of about 12.5 preliminary to its introduction into the impregnating bath.

A continuous paper sheet 14 is passed through the liquid resin in the impregnating bath and thereafter passed between squeeze rolls 16 which remove the surplus resin. The saturated sheet then is passed through an oven 18 having a temperature of, for example, from 250–400° F. In the oven the resin content of the sheets is further advanced until the cure is at least 60% complete, preferably substantially complete.

As has been indicated above, this is possible while still retaining suitability of the cured sheet product to continuous laminating procedures since when an acetone-formaldehyde resin prepared in the indicated manner is employed, the sheet does not become brittle and in addition, has developed superior internal bond and masking qualities.

After leaving oven 18, the dry, flexible, impregnated sheet may be used to overlay base materials in several different ways, depending upon the nature of the base materials, the type of overlaid product desired and other factors.

In a preferred sequence, the sheet may be used in the continuous roll-laminating of plywood, wood composition board and other base materials. This sequence is illustrated in FIG. 4.

The continuous paper sheet leaving oven 18 is wound on a reel and transferred to a roll press unit. Here it is passed continuously through an adhesive applicator 20 where one face of the sheet is coated with a casein glue, animal glue, blood glue, soya glue, phenolic resin, or other suitable adhesive. The adhesive-coated sheet then passes to a roll press 22. Here it meets a flow of plywood or other panels 24 placed edge to edge.

The fibrous sheet and panels pass through the roll press at a relatively rapid rate. The resinous impregnating agent of the fibrous sheet having been substantially fully cured in oven 18, it is necessary only to bond the sheet to the base material, a result obtained in but a second or two in the roll press. This results in the production of a flow of sheet-overlaid panels 26 delivered from the roll press. The panels are broken apart and stacked and transferred to their various applications.

Although the continuous process above described has the advantages of high production rate and low cost, if in particular instances, a step-wise batch procedure is desired, the sequence illustrated in FIGS. 5, 6, 7 and 8 may be employed.

In this sequence the cured, impregnated sheet is passed from oven 18 through an adhesive applicator 28 which coats one face of the sheet with a suitable adhesive. If the adhesive demands such treatment, the coated sheet then may be passed through an oven 30 to dry the adhesive after which it is rolled and transported to sheeting apparatus, indicated generally at 32 in FIG. 6. The continuous sheet is fed by means of cooperating drive rolls 34 at a rate coordinated with the timing of the knife of sheeting apparatus 32, which reduces the continuous sheet to overlay segments of predetermined size.

The overlay segments then may be employed in the manufacture of overlaid plywood by the operations indicated schematically in FIGS. 7 and 8.

In the one-step embodiment of FIG. 7, adhesive-coated wood veneers 36 are laid up together with resin impregnated overlay sheet 38 between the platens of a conventional platen-type hot press 40. Operation of the press then glues the veneers to each other and the overlay panel to the resulting plywood panel in a single operation.

In the two-step embodiment of FIG. 8, a finished plywood panel 42 manufactured in a first step is overlaid with a resin-impregnated sheet 38 between the platens of hot press 40. Operation of the press then in a second step completes the fabrication of the paper overlaid product.

It thus will be seen that the presently described resin-impregnated overlay sheets are versatile in their application to a variety of base materials by a variety of manufacturing procedures.

The overlays of the invention and the method for their preparation are described further in the following examples.

EXAMPLE 1

This example illustrates a typical cook of an acetone-formaldehyde impregnating resin of the invention, and the manner of determining the critical end point of the cook. 162 pounds of 37% aqueous formaldehyde, 39 pounds of acetone and 24 pounds of an 11.3% by weight aqueous sodium carbonate solution were charged into a conventional resin cooking kettle and permitted to react with each other. The reaction was maintained at about the reflux temperature of the reaction mixture. The pH was maintained at a level between about pH 7 and 10.5 by the addition of aqueous sodium carbonate solution.

After the charge had cooked for about 3 hours, two pound samples were withdrawn from the cooker at about hourly intervals. Part of these samples were used to determine the dilutability of the resin and part to measure the internal bond developed in paper impregnated with the resin and cured.

The dilutability of the first sample was determined by measuring the amount of 11.3% by weight aqueous sodium carbonate solution which could be added to 1 milliliter of the resin in order to obtain a stable cloud point, persistent for 5 minutes. This measured the solubility of the resin in aqueous alkali and hence its degree of advancement.

In greater detail, the dilutability of the impregnating resin was obtained by pipetting 5 milliliters of the resin into a 125 milliliter flask. 11.3% aqueous sodium carbonate was added to the resin from a burette in a slow, steady stream, with mixing.

As the end point or dilutability point was approached, a bluish white cloud was formed. The rate of sodium carbonate solution addition was decreased to 15–20 drops per minute and continued until the bluish white cloud persisted and did not disappear with mixing for a time interval of 5 minutes. The dilutability point then was calculated by dividing the milliliters of sodium carbonate solution used by 5, the number of milliliters of resin used in the sample. This gives as a basis of comparison the dilutability of a 1 milliliter sample of the resin.

Determined in this manner the dilutability of the Example 1 resin at about hourly cooking intervals were respectively infinity, 20, 0.8, and 0.5.

The other portion of the periodically withdrawn samples was employed for a determination of the internal bond developed upon impregnating paper with the resin, curing the resin substantially to completion, and measuring the internal bond developed in the paper. This procedure was as follows:

To the sample under test sufficient 36.5% aqueous sodium hydroxide catalyst was added to raise the pH to a value of from 11.5 to 12.5, thus making possible an accelerated cure time. The sample was placed in a shallow vessel and a test sheet of commercial saturating paper having a weight of 51 pounds per thousand square feet immersed in the resin sample until it was completely saturated with the liquid resin. The wet impregnated sheet was cured in an oven at 350° F. until the cure was substantially complete.

The cured sheet then was subjected to ASTM D–897 test for internal bond determination, modified by omitting the factor of humidity control.

In accordance with this test, each sheet was cut into 2″ x 2″ squares. These were glued with epoxy adhesive to 2″ x 2″ x ⅜″ metal blocks. One side of each block had a smooth face and the other face an eye hook in its center.

The blocks then were pulled apart with a hydraulic testing machine and the internal bond calculated for each sample as a percent of the maximum internal bond developed, thus eliminating the effect of resin concentration on bond development. The results are given below.

| Sample No. | 1 | 2 | 3 | 4 |
|---|---|---|---|---|
| Dilutability | ∞ | 20 | .8 | 0.5 |
| Internal bond (percent of maximum) | 47 | 100 | 95 | 53 |

The relationship between dilutability and internal bond is shown graphically in FIG. 1. It will be seen that the desirable property of internal bond strength is critically dependent upon the degree of advancement of the resin, as evidenced by the dilutability factor. When the dilutability factor is too low or too high, internal bond strength is affected adversely. Hence, selecting an internal bond of 60% of maximum as being the critical threshold value, it is seen that the cooking of the resin impregnant must be controlled to result in dilutability values of between 0.5 and 500 units in order to provide a suitable product.

EXAMPLE 2

This example illustrates the relationship between developed internal bond and masking qualities of the presently described, resin-impregnated fibrous sheet overlays.

Following the procedure set forth in Example 1, a resinous product was prepared on the large commercial scale from a charge of 12,900 pounds of 46.5% by weight aqueous formaldehyde, 3900 pounds of acetone, 2400 pounds of 11.3% aqueous sodium carbonate solution, and 3,320 pounds of water. Again the pH was held between pH 7 and 10.5.

The charge was cooked at the reflux temperature until a dilutability of 1 was obtained.

A portion of the resinous product was withdrawn and treated with sufficient 36.5% aqueous sodium hydroxide solution to adjust the pH to a value of from 11.5 to 12.5. The resulting resin was used to impregnate commercial saturating paper sheets having weights of 51 pounds per thousand square feet. The sheets were oven cured at 350° F. for time intervals of 1, 2, 3, 4, 5 and 15 minutes.

The internal bond values of each sheet then were determined by the method of Example 1.

The masking quality of each sheet was determined by applying a phenolic glue line to a piece of 1″ x 5½″ x 11″ vertical grain C finish Douglas fir lumber. The glue line was dried to a non-tacky state and one of the resin-impregnated paper sheets superimposed.

The assembly was pressed for 2 minutes at 300° F. and 200 p.s.i. The degree of masking of the defects in the lumber was evaluated visually and indicated by assigning a value of from 1–10, a value of 10 indicating the best masking qualities. The results were as follows:

| Oven cure time (minutes) | Internal bond (percent of maximum) | Masking qualities |
|---|---|---|
| 1 | 29 | 3 |
| 2 | 57 | 9 |
| 3 | 73 | 10 |
| 4 | 100 | 10 |
| 5 | 99 | 10 |
| 15 | 66 | 10 |

The foregoing values were used in establishing the plot of FIG. 2. It will be observed that the graph of FIG. 2 corresponds with the graph of FIG. 1 in indicating that at an internal bond strength of 60%, determined by maintaining the dilutability of the resin cook between the limits of 0.5 and 500 units, the masking qualities of the impregnated paper are maintained at a constantly high level.

To establish uniformity of oven drying, the impregnated sheet was placed in an electrically heated, air-circulating oven at a constant temperature of 350° F. The sheet was placed in the oven on a wire mesh screen in the upper one-third section. After drying for the selected time, the sheet was placed in a larger oven at 110° F. and with increased air circulation for ½ hour. This equalized the moisture content of the sheets dried at different times.

Further to test the properties of the products, the impregnated paper plywood samples were subjected to the following standard tests.

(A) American Plywood Association Tests:

(1) Alkali resistance of concrete form high density overlaid plywood.
(2) Exterior coatings on plywood:
    (a) soak
    (b) boil
    (c) freeze
    (d) exterior weathering
    (e) weatherometer
    (f) infrared.

(B) U.S. Commercial Standard CS–45–60 Tests:

(1) Vacuum-pressure soak test
(2) cold soak test
(3) boil test
(4) Fire test.

In all instances the products demonstrated superior performance.

Thus it will be apparent that by the present invention we have provided a resin-impregnated fibrous sheet overlay for plywood and other base materials, and a method for its production, which overlay by reason of its composition and controlled advancement during cooking may be used to impregnate a paper or other porous overlay sheet, after which the sheet may be cured substantially fully before being applied to the base material. This may be accomplished while still retaining sufficient sheet flexibility to enable its being wound into rolls as required for rapid continuous application. This desirable result, effectuating material economies in production costs, is accompanied by the further important result of providing an overlaid product having superior masking and other physical properties.

Having thus described our invention, we claim:

1. A flexible, wear-resistant, highly masking fibrous overlay sheet impregnated with the resinous condensation product of acetone and formaldehyde, the resin having in the uncured condition at the time of sheet impregnation an aqueous alkali dilutability end point of from 0.5 ml. to 500 ml. of 11.3 weight percent sodium carbonate soluton/1 ml. of resin at 25° C. and in the cured condition at the time of sheet use imparting to the sheet a resin-developed internal bond strength equal to at least 60% of the maximum internal bond strength obtainable by exhaustive curing of the resin content of the impregnated sheet.

2. The sheet product of claim 1 wherein the sheet impregnated with the cured resin comprises a porous paper sheet.

3. The fibrous overlay sheet of claim 1 wherein the internal bond strength of the impregnated sheet is equal to that obtained by substantially fully curing the resin content of the impregnated sheet.

4. The method of making a flexible, wear-resistant, fibrous overlay sheet which comprises:
  (a) preparing a resin-forming mixture comprising formaldehyde, acetone and an alkaline catalyst in the proportions of about 2–4 mols of formaldehyde per mol of acetone together with sufficient alkaline catalyst for acetone-formaldehyde resins to maintain the mixture at a pH of from about 7–10.5,
  (b) cooking the mixture at substantially its reflux temperature to an aqueous alkali dilutability end point of from 0.5 ml. to 500 ml. of 11.3 weight percent sodium carbonate solution/1 ml. of resin at 25° C.,
  (c) impregnating a porous sheet with the resin product and
  (d) heat curing the resin content of the impregnated sheet sufficiently to develop at least about 60% of its potential internal bond strength.

5. The method of claim 4 wherein the porous sheet is a porous paper sheet.

6. The method of claim 4 wherein the resin content of the impregnated sheet is substantially fully cured.

7. The method of claim 4 including the step of coating one surface of the cured, impregnated sheet with an adhesive, and applying the adhesive coated sheet to a structural base.

8. The method of claim 4 including the step of coating one surface of the cured, impregnated sheet with an adhesive, and applying the adhesive coated sheet to a plywood base sheet.

References Cited

UNITED STATES PATENTS

| | | | |
|---|---|---|---|
| 1,482,929 | 2/1924 | Huxham | 260—64 |
| 1,524,508 | 11/1924 | Ellis | 260—64 |
| 1,524,509 | 11/1924 | Ellis | 260—64 |
| 2,237,325 | 4/1941 | Balz | 260—64 |
| 2,389,682 | 11/1945 | Nebel | 260—42 |
| 2,504,835 | 4/1950 | Hewett et al. | 260—64 |
| 2,538,883 | 1/1951 | Schrimpe | 260—43 |
| 3,058,843 | 10/1962 | Heischler et al. | 117—122 |
| 3,130,172 | 4/1964 | Harvey et al. | 260—6 |

HAROLD ANSHER, Primary Examiner

D. J. FRITSCH, Assistant Examiner

U.S. Cl. X.R.

117—122, 161; 156—336; 161—413